June 6, 1939.  M. F. BATES  2,161,241
QUICK SETTING MEANS FOR DIRECTIONAL GYROSCOPES
Filed Nov. 24, 1936  2 Sheets-Sheet 1
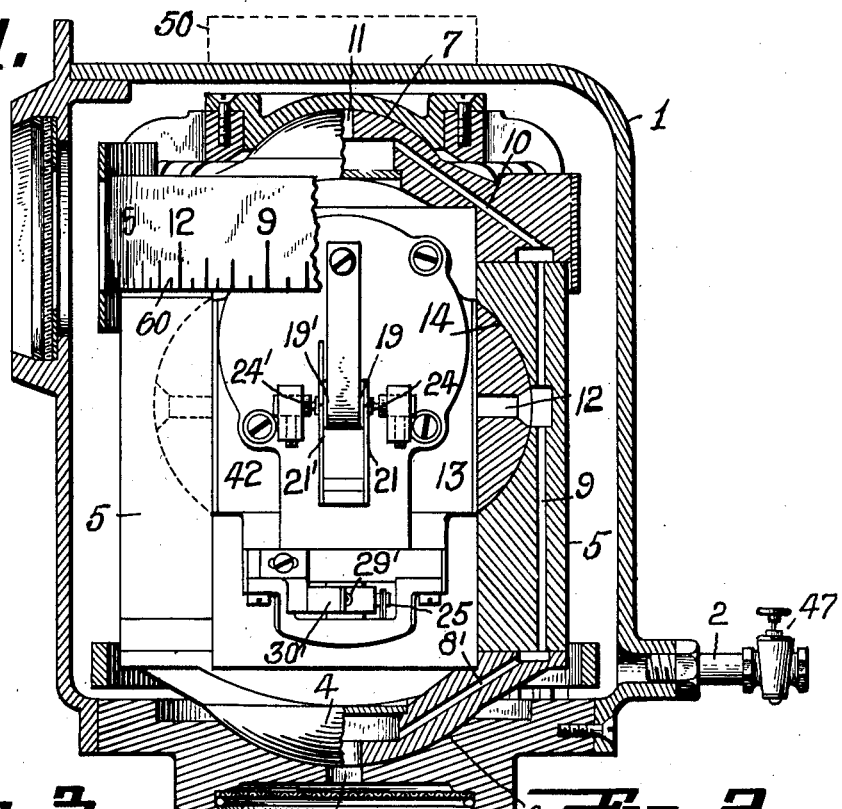
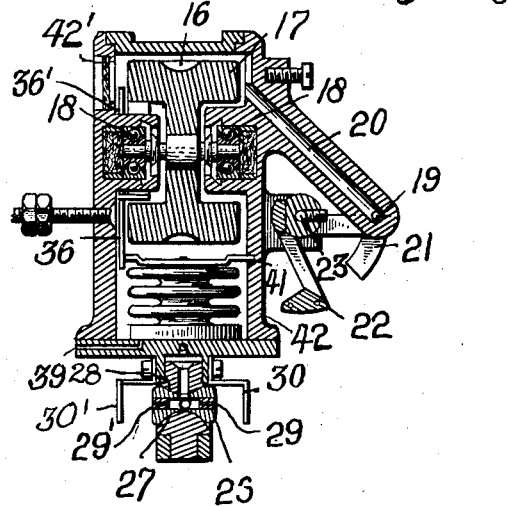
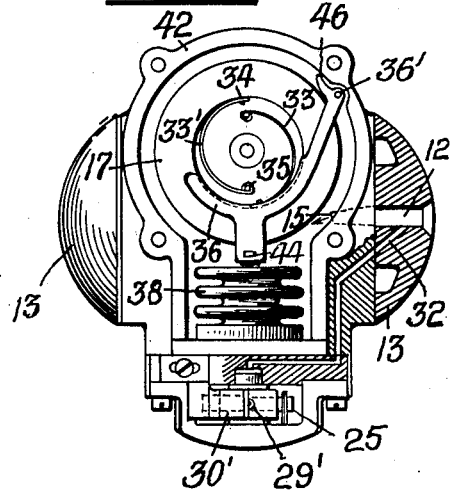
INVENTOR
MORTIMER F. BATES
BY
Herbert H. Thompson
HIS ATTORNEY.

June 6, 1939.  M. F. BATES  2,161,241

QUICK SETTING MEANS FOR DIRECTIONAL GYROSCOPES

Filed Nov. 24, 1936  2 Sheets-Sheet 2

INVENTOR
MORTIMER F. BATES
BY Herbert H. Thompson
HIS ATTORNEY.

Patented June 6, 1939

2,161,241

UNITED STATES PATENT OFFICE 2,161,241

QUICK SETTING MEANS FOR DIRECTIONAL GYROSCOPES

Mortimer F. Bates, Brooklyn, N. Y., assignor to Sperry Gyroscope Company, Inc., Brooklyn, N. Y., a corporation of New York Application November 24, 1936, Serial No. 112,489

11 Claims. (Cl. 33—222)

This invention relates to setting devices for directional gyroscopes, more especially to directional gyroscopes which are controlled from a magnetic compass and are usually known as gyromagnetic compasses or "slave" directional gyroscopes.

Although the gyro-magnetic compass has directive power, that is, it will turn into the north if displaced therefrom, such movement is purposely made relatively slow, so that it is desirable to set the compass, before the airplane takes off, approximately on the meridian. The ordinary methods of resetting directional gyroscopes, such as shown in the prior patent to Elmer A. Sperry, Jr., #1,974,220, dated December 4, 1934, are not well suited to a gyro-magnetic compass since the airplane on the ground is usually rearwardly inclined to the horizontal approximately 15°, so that if the gyroscope is caged in that position the axis of the magnetic needle will not be truly vertical and deviation will result. In another case it has been proposed to cage the gyroscope by cutting off the air supply to the air bearings.

According to my invention, I provide a means for accelerating the normally slow settling of the gyroscope on the meridian by an auxiliary servomotor system which leaves the gyroscope horizontal and does not interfere with the air supply for the air bearings or the gravitational and magnetic compass controls.

In my invention I prefer to employ the same torque device for bringing the gyroscope to the magnetic meridian as is employed in the normal operation of the gyroscope. During the setting operation I increase the effectiveness of said torque by varying the relative strength of the gyroscopic moment and the setting torque or couple so that the gyroscope is quickly brought to the magnetic meridian. While this function may be accomplished by increasing the actual torque about the horizontal axis of the gyroscope, I prefer rather to decrease the gyroscopic moment during that time, which necessarily results in an increase in the resultant precessional rate, since the rate of precession of the gyroscope is an inverse function of the speed of the rotor as well as a direct function of the magnitude of the precession torque.

My invention is especially applicable to the air driven, air borne type of gyro-magnetic compass, such as shown in the prior application of Leslie F. Carter, now Patent No. 2,091,964, dated September 7, 1937, in which air under negative pressure is employed not only to spin the rotor and to float the gyroscope on air bearings, but also as a meridian seeking torque applying means and as the erecting means. In my invention I employ a means for limiting the speed of the rotor to a fraction of its normal speed during, say, the first two minutes of operation, so that during that time the meridian seeking torque will quickly bring the gyroscope to the meridian. At the same time the erecting torque is also relatively great.

Another object of my invention is to improve this type of gyro-magnetic compass by rearrangement and redesign of the magnetic and gravitational elements.

Further objects will be apparent from the following description.

Referring to the drawings, showing the preferred form of my invention,

Fig. 1 is a vertical section, partly in elevation, of my improved gyro-magnetic compass.

Fig. 2 is a side elevation of the rotor bearing casing, with one cover or face plate removed.

Fig. 3 is a vertical section of the same, at right angles to Fig. 2.

Figure 4:
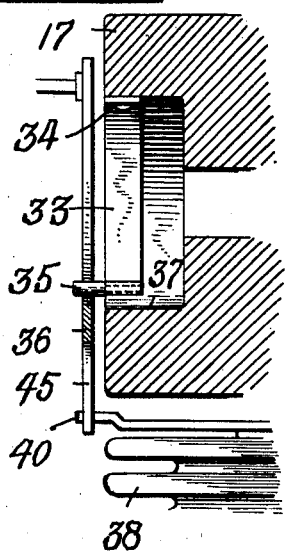
Fig. 4 is an enlarged detail of the speed limiting device for the rotor.
Figure 5:
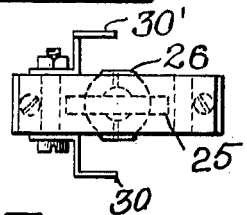
Fig. 5 is a bottom plan view of the magnetic element and its controlling jets.
Figure 6:
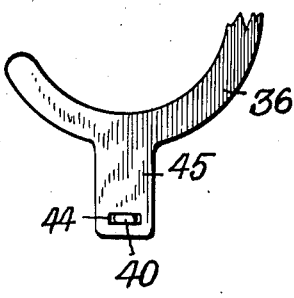
Fig. 6 is a detail of one portion of the braking device for the rotor.

My gyro-magnetic compass is shown as enclosed in an outer casing 1, from which air is continuously exhausted through pipe 2 while control valve 47 is open. Air is admitted into the bottom of the case through a screened opening 3, whence a portion passes between the lower button 4 of the vertical ring 5 and the cup 6 in the casing to float the sensitive element about a vertical axis. A compass card is shown at 60, secured to the vertical ring. An upper air borne bearing 7 is also provided, to which air is supplied through passageways 8, 8', 9, 10 and 11. Air also passes into the rotor bearing case and the vertical ring through passageways 12, a portion of the air escaping between the buttons 13 on the rotor bearing case and the cup shaped bearings 14 in the vertical ring to float the rotor bearing casing 42 in vertical ring for oscillation about a horizontal axis. A portion of the air also passes within said case to spin the rotor through nozzle 15, the jet from which impinges against buckets 16 in the rotor 17, the rotor being journaled within the case on antifriction bearings 18. As shown, the bearings 18 are preferably not air borne, to avoid scoring of the bearings when the air supply is shut off. 42' is a window for observing gyro speed.

The erecting device is shown as a pair of oppositely directed jets 19, 19' issuing from a channel 20 connected to the interior of the gyro case and which normally are partially intercepted by a pair of normally horizontal shutters 21, 21' secured to a pendulous element 22 pivoted at 23 on suitable pivots, such as jewel supports 24, 24' on the rotor bearing casing 42.

The magnetic element I show mounted at the bottom of the rotor bearing case, this element being shown as comprising a horizontal permanent magnet or magnetic needle 25 mounted crosswise in a member 26 floated between upper and lower air bearings 27 and 28 for freedom about its vertical axis only. From said member issue oppositely directed air jets from nozzles 29 and 29', which normally equally intercept baffles 30 and 30'. In case, however, there is departure of the gyroscope from the position of the magnetic needle, the reactive balance of the jets is disturbed and an unbalanced torque exerted on the gyroscope about its horizontal axis to cause the same to seek the meridian. Preferably, the air supply for the bearings of said magnetic element is not taken from the interior of the rotor case, but is a fresh air supply secured through channel 32 connected with incoming air through channel 12 in one or both buttons 13. By mounting the magnetic element at the bottom of the gyro case instead of at the side, I increase the lever arm of the torques applied by the jets 29, 29' and render compensation easier, the compensator being indicated at 50.

For limiting the speed of the rotor so that it may be quickly brought on the meridian, I preferably employ a speed governing means to positively brake the same when the speed tends to exceed a certain predetermined fraction, for example, one tenth of the ultimate speed, although obviously I might, within the scope of my invention, reduce the spinning torque at that time instead. By maintaining the full force of the spinning jet on the gyro during starting, I avoid running the risk that the rotor fails to start, as may happen in case the spinning torque is greatly reduced.

To accomplish my invention, I have shown one or more small leaf springs 33 and 33' anchored at one end 34 to inner periphery 37 of the rim of the rotor. The other end may be slightly weighted and is normally free, as shown in Fig. 2, having a pin 35 therein extending axially beyond the rotor (Figs. 3 and 4). Also beyond the rotor I place a brake shoe 36 pivoted to the casing 42 at 36', against which said pins are adapted to rub as the spin of the rotor increases, throwing out the free ends of the springs. The outer movement of said free ends is limited, however, by contact thereof with the under surface 37 of rim 17, but under braking conditions the brake shoe 36 is moved upwardly slightly above said surface 37, as shown in Figs. 2 and 4, so that the pins will contact therewith. The position of the brake shoe 36 is normally down, i. e., when the instrument is in full operation, so that the rotor is free to rotate at a maximum speed. Said brake shoe, however, is pushed upwardly for a limited time during starting by means of a Sylphon 38 or other container or cylinder having a movable wall or end, within the rotor case which has a small leak to the interior of casing 1, as through capillary passage 39. On the top of a movable end of said Sylphon rests a lever 40 which, at one end 41, is fulcrumed in the casing 42 and at its other end loosely enters a slot 44 in a downward extension 45 from the brake shoe 36.

The operation of this portion of my invention is as follows. When the starting valve 47 is opened, there immediately results a large drop in atmospheric pressure within the gyro case, causing the spinning, erecting and meridian seeking jets to quickly exert full force on the gyroscope and also to air float the same. The air pressure within the Sylphon 38, however, decreases very slowly owing to the capillary connection and, due to the decreased pressure within the rotor bearing casing surrounding the Sylphon, the Sylphon expands and pushes the brake shoe upwardly into operative position and until the limit lug 46 contacts with the casing 42. Therefore, when the rotor reaches a predetermined speed, the brake pins 35 will contact with the brake shoe and the speed will be held low until the air pressure within Sylphon 38 falls sufficiently to collapse the same, at which time the braking effect on the rotor will be removed and the rotor will quickly rise to full speed. By this means the gyroscope is quickly set and erected so that it is ready for use in a minimum time.

As many changes could be made in the above construction and many apparently widely different embodiments of this invention would be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a three degree of freedom gyroscope having a rotor and spinning means therefor, means applying a torque to said gyroscope for precessing the gyroscope into a predetermined position, a normally inoperative device for limiting the rotor speed, and automatic means for rendering said device temporarily operative during the starting up period of the gyroscope to accelerate precession of said gyroscope into said position due to said torque means.

2. In a gyro-magnetic compass having a rotor and spinning means therefor, torque means governed by the relative position of said gyroscope and the magnetic element for causing said gyroscope to slowly follow said element, and means for increasing the rate of following for the limited time taken to initially set the gyroscope near the meridian, including a normally inoperative braking device for limiting the rotor speed and automatic means for rendering said braking device temporarily operative only during the starting up of said gyro-magnetic compass.

3. In an air spun free gyroscope of the negative pressure type, an outer casing from which air is exhausted at will, a gyro rotor neutrally mounted for three degrees of freedom within said casing, a spinning jet for spinning said rotor connected to the atmosphere externally of said casing, other jets for coercing the gyroscope also connected to the atmosphere, a normally inoperative braking means for the rotor, and a Sylphon within said casing having a slow leak and acting on said braking means to render the same operative during a limited time determined by the size of the leak after the casing is first exhausted.

4. In an air spun free gyroscope of the negative pressure type, an outer casing from which air is exhausted while the gyroscope is running, a gyroscope within said casing, a spinning jet therefor connected to the atmosphere, other jets for coercing the gyroscope also connected to the atmosphere, a Sylphon within said casing having a slow leak, and means controlled by the expansion of said Sylphon during starting for temporarily limiting the rotor speed to limit the rate of precession of said gyroscope due to said coercing jets.

5. In an air spun free gyroscope of the negative pressure type, an outer casing from which air is exhausted while the gyroscope is running, a gyroscope within said casing, a spinning jet therefor connected to the atmosphere, ports for erecting the gyroscope leading from the interior of the gyroscope to within said outer casing, a Sylphon within said casing having a slow leak, and means controlled by the expansion of said Sylphon during starting, temporarily keeping the rotor speed below normal and thereby increasing the rate of precession of said gyroscope due to said coercing jets.

6. In an air spun gyroscope of the negative pressure type, an outer casing from which air is exhausted while the rotor is running, a rotor bearing casing, a rotor within said casing, a centrifugal spring weight on said rotor to limit the speed thereof, a cooperating brake member on said casing, and means responsive to relatively abrupt changes in pressure difference between said casings for varying the position of said brake member for engaging said weight to limit the rotor speed.

7. In a slave directional gyroscope having a rotor and spinning means therefor, means applying a torque on said gyroscope for slowly precessing the gyroscope into a desired position, and means for accelerating such precession toward the desired position during the starting-up period, including means for reducing the relative strength of the gyroscopic moment with respect to the setting torque and means for limiting the period of operation of said second named means approximately to said starting-up period.

8. In an air coerced directional gyroscope, the combination with a free gyroscope mounted for turning about a vertical axis and oscillation about a horizontal axis, air jet means for coercing the gyroscope to cause precession in azimuth, means for supplying pressure air to said jet means, a container having a movable end wall and a slow leak subject to said pressure means, whereby said wall is temporarily displaced during the starting up period of the gyroscope, and means operated by said wall for increasing the relative strength of the coercing means with respect to the gyroscopic moment during the starting up period.

9. In an air spun, air coerced directional gyroscope, the combination with a free gyroscope mounted for turning about a vertical axis and oscillation about a horizontal axis, air jet means for spinning the gyroscope, air jet means for coercing the gyroscope to cause precession in azimuth, means for supplying pressure air to said jet means, a container having a movable end wall and a slow leak subject to said pressure means, whereby said wall is temporarily displaced during the starting up period of the gyroscope, and means operated by said wall for increasing the relative strength of the coercing means with respect to the gyroscopic moment during the starting up period.

10. In an air spun free gyroscope of the negative pressure type, an outer casing from which air is exhausted while the gyroscope is running, a gyroscope within said casing, a spinning jet therefor connected to the atmosphere, ports for erecting the gyroscope leading from the interior of the gyroscope to within said outer casing, a Sylphon within said casing having a slow leak, and means controlled by the expansion of said Sylphon during starting for temporarily increasing the rate of precession of said gyroscope due to said coercing jets.

11. In a slave directional gyroscope having a rotor and spinning means therefor, air jet means applying a torque on said gyroscope for slowly precessing the gyroscope into a desired position, and means for accelerating such precession toward the desired position during the starting up period, including means for varying the relative strength of the gyroscopic moment and an expansible container having a slow leak for controlling the period of operation of said last named means.

MORTIMER F. BATES.